United States Patent [19]

Vrielink

[11] Patent Number: 4,584,665
[45] Date of Patent: Apr. 22, 1986

[54] ARRANGEMENT FOR PROTECTING AGAINST THE UNAUTHORIZED READING OF PROGRAM WORDS STORED IN A MEMORY

[75] Inventor: Hendrik Vrielink, Eindhoven, Netherlands

[73] Assignee: U.S. Philips Corporation, New York, N.Y.

[21] Appl. No.: 491,512

[22] Filed: May 4, 1983

[30] Foreign Application Priority Data

May 6, 1982 [NL] Netherlands ............... 8201847

[51] Int. Cl.[4] ..................... G06F 7/04; G06K 7/00
[52] U.S. Cl. ............................................. 364/900
[58] Field of Search ... 364/200 MS File, 900 MS File

[56] References Cited

U.S. PATENT DOCUMENTS

| 3,806,882 | 4/1974 | Clarke | 364/200 |
|---|---|---|---|
| 3,996,449 | 12/1976 | Attanasio et al. | 364/200 |
| 4,183,085 | 1/1980 | Roberts et al. | 364/200 |
| 4,271,482 | 6/1981 | Giraud | 364/900 |
| 4,446,519 | 5/1984 | Thomas | 364/300 |

Primary Examiner—Gareth D. Shaw
Assistant Examiner—Daniel K. Dorsey
Attorney, Agent, or Firm—Jack E. Haken; James J. Cannon, Jr.

[57] ABSTRACT

The unauthorized reading of program words stored in a memory of a dating processing system is counteracted by supplying the unauthorized reader with nuisance data from a data source instead of program words from the memory. In order to determine whether the memory is being read by an unauthorized reader or by a data processor unit of the system for the execution of the program, use is made of the sequence in which the data processor unit reads the program words from the memory. This sequence deviates from the sequence in which the program words are stored in the memory. Additional information is added to each program word stored in the memory, said additional information containing an indication of a subsequent program word to be read by the data processor unit. On the basis of this additional information it is tested whether the memory is being read in the sequence determined by the data processor, for the execution of the program, or in some other sequence by an unauthorized reader who does not know the sequence determined by the data processor unit.

11 Claims, 4 Drawing Figures

ARRANGEMENT FOR PROTECTING AGAINST THE UNAUTHORIZED READING OF PROGRAM WORDS STORED IN A MEMORY

BACKGROUND OF THE INVENTION

1. Field of the Invention

The invention relates to an arrangement for protection against the unauthorized reading of program words stored in a memory notably a program memory, which forms part of a memory device. Said protection arrangement includes a data processor unit having an address output which is connected to an address input of the memory in order to address the stored program words during a processing operation in a given sequence which is determined by the data processor unit.

2. Description of the Prior Art

Devices which are controlled by a data processor unit include a memory, for example, a ROM or a PROM, in which programs and other information (termed software), are stored in the form of program words for the execution of data processing operations. The design of such software is time consuming and is also expensive. Therefore, it is important to prevent unauthorized reading of such software.

A number of methods by which the (software) content of a memory is protected against unauthorized reading are already known. For example, it is known to use code words or access keys, or so-called protection instructions, which prevent access to the program words stored in the memory. Such a method is described, for example, in the article "Computer program protection", by E. J. Sengyel and D. H. Olson; published in I.B.M. TDB Vol. 14, No. 11, April 1972, page 3531.

It is a drawback of the known method that an unsuccessful attempt to copy the software from the memory is noticed rather quickly. An unauthorized reader may then find a way of deactivating the protection method, so that unauthorized reading can still take place.

SUMMARY OF THE INVENTION

It is an object of the invention to provide an arrangement in which unauthorized reading of the content of a memory thereof results in the outputting of completely useless information to the unauthorized reader, without such reader becoming aware of that during the unauthorized reading.

To this end, an arrangement in accordance with the invention is characterized in that the memory device has a selection unit, a verification unit, and a data source which is separate from the memory and serves to supply at least one nuisance word which is unrelated to said program words. Said selection unit has a first input which is connected to a first output of the memory and a second input which is connected to the output of the data source, an additional information being added to each program word stored in the memory. A second output of the memory is connected to a first input of the verification unit in order to present said additional information thereto, a second input of the verification unit being connected to a connection of the memory in order to present program information. Said verification unit has first means for storing said additional information when a first program word is read from the memory, said additional information pertaining to a subsequent program word which is determined by said sequence and which succeeds the first program word. Said verification unit has second means for verifying, when a second program word is read from the memory, whether the program information of the read second program word corresponds to the stored additional information pertaining to the subsequent program word, and for generating a first signal when said verification results in correspondence and a second signal when said verification results in non-correspondence. The selection unit has a control input for receiving said first and second signals in order to supply the read program word from the memory on an output under the control of said first signal and to block the supply of at least one program word from the memory under the control of said second signal and to replace this program word on the output by a nuisance word from the data source. The program words are stored in the memory in a well-defined sequence. However, the sequence in which the program words are fetched by the data processor unit during the execution of the program deviates from the well-defined sequence in which the program words are stored in the memory. For example, under the control of the data processor unit, "jumps" are customarily made to sub-programs. Only the designer of the program and the data processor unit know the sequence in which the program words have to be read from the memory for the execution of the program. An unauthorized reader would not know this sequence and will read the program words from the memory in some other sequence, for example, one after the other in the sequence in which they have been stored. When the sequence determined by the data processor is not respected, the first output of the memory will be blocked in respect of at least one of the program words to the output from the memory and the program word to be output will be replaced by a nuisance word from the data source. This nuisance word from the data source is completely useless for the execution of the program. This will not be noticed by the unauthorized reader during the copying operation, because "apparent" program words are outputted on the output of the arrangement as usual. However, when this "copied" program is used, it will be realized that it is useless.

A first preferred embodiment of an arrangement in accordance with the invention is characterized in that said connection of the memory comprises an address input of the memory, said program information contains at least a part of the address of the program word. Said verification can be simply implemented on the basis of a few bits of the address of the program word addressed by the data processor unit.

Preferably, said first means of the verification unit comprises its own register and a memory table, a first input of said register being connected to the first input of the verification unit, an output of the data processor unit being connected to a second input of this register in order to supply a control signal for a read operation, an output of said register being connected to an address input of the memory table which is for the storage of program word addresses, said additional information containing an address for a location in the memory table. When use is made of such a memory table in which addresses of program words are stored, the verification can be performed on all bits of the address word, without substantial memory space being occupied for the storage of the additional information.

A second preferred embodiment of an arrangement in accordance with the invention is characterized in that said connection of the memory includes a data output of the memory, said program information contains at least a part of the program word. Thus, in addition to the verification on the basis of address words, verification on the basis of the program words themselves is also possible.

A further preferred embodiment of an arrangement in accordance with the invention is characterized in that said program words to be protected are subdivided into two different groups, exclusive additional information being added to each program word of a first group, and non-exclusive additional information being added to each program word of a second group. Said verification unit includes recognition means responsive to the recognition of additional information of said second group and for deactivating the verification unit under the control of an additional information of said second group, thus generating a first signal. The addition of exclusive additional information to each program word requires a large amount of storage space and the efficiency of the arrangement for protection against the unauthorized reading is increased only slightly thereby. It suffices to provide only a first group of program words with exclusive additional information and to add non-exclusive additional information to the program words which do not form part of this group. For example, all program words of the second group can have the same additional information. Because of this division into first and second groups, only a small amount of the storage space available will be occupied by the additional information.

Preferably, said data source comprises a random generator. When use is made of a random generator, different nuisance program words can be generated each time an unauthorized reader attempts to copy the memory content.

BRIEF DESCRIPTION OF THE DRAWINGS

Embodiments of the invention will be described in detail hereinafter by way of example, with reference to the accompanying drawings. In the drawings.

DESCRIPTION OF THE PREFERRED EMBODIMENTS

A data processing system utilizes a data processor unit for the processing of data in accordance with a program. This program is stored in a memory, sometimes referred to as the program memory, in the form of program words such as, for example, instructions, data, etc. This memory is usually a non-volatile memory, for example, a ROM, a PROM, or another integrated circuit memory. The program words of a program are stored in the memory in a given sequence. When the program is executed, the data processor unit will read the program words in the memory in a sequence which is determined by the content and the nature of the program. The sequence deviates from a given (e.g. sequential) sequence in which the program words are stored in the memory. This means that under the control of the data processor unit, "jumps" are made in the reading of the program words stored in the memory. An unauthorized reader does not know the sequence in which the program words are read from the memory by the data processor unit during the execution of the program. When an unauthorized reader attempts to read the program from the memory, he will likely read the program words in a sequence (e.g. the sequential sequence) which deviates from the sequence used by the data processor unit.

In order to provide protection against unauthorized reading, the invention utilizes the fact that the unauthorized reader does not know the sequence used by the data processor.

The invention will be described with reference to a number of embodiments in each of which instruction words are the chosen program words which are used. However, the invention can also be carried out in the same way using data words or any other type of program words.

Figure 1A:
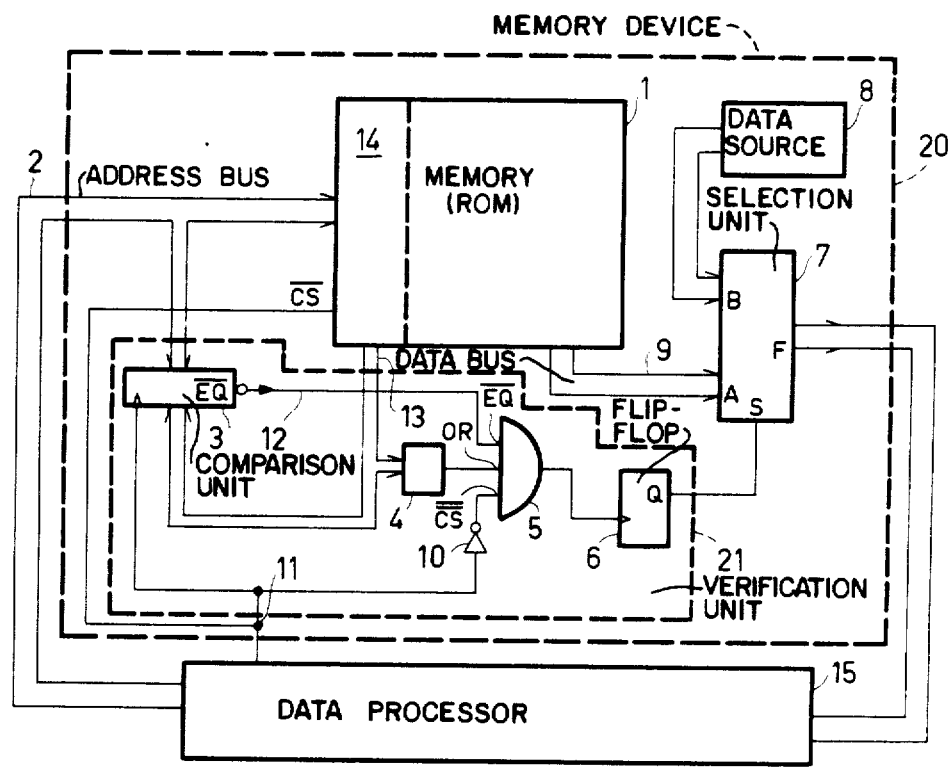
FIG. 1a shows an embodiment of an arrangement for protection against unauthorized reading in accordance with the invention in which verification is performed on the basis of address signals.

FIG. 1a shows a simple embodiment of an arrangement for protection against unauthorized reading in accordance with the invention. A memory device 20 comprises a memory 1, for example, a ROM, an address input of which has a width of, for example, 11 bits and is connected to an address bus 2 of the arrangement. A first data output of the memory 1 is connected, via a first data bus 9 of, for example, 8 bits, to a first input A of a selection unit 7. A second data output of the memory 1 is connected to a first input of a verification unit 21 via a second data bus 13. A second input of the verification unit 21 is connected to a number of lines, for example, four, of the address bus 2. A second input B of the selection unit 7 is connected to an output of a data source 8. The selection unit 7 also comprises a control input S which is connected to an output of the verification unit 21. A line 11 carries a signal $\overline{CS}$ (Chip Select) which is presented to an input $\overline{CS}$ of the memory 1 and also to a third input of the verification unit 21. This verification unit 21 comprises a comparison unit 3, first, second and third inputs of which are connected to the first, second and third inputs, respectively, of the verification unit 21. The first input of the verification unit 21 is also connected to a first input of a logic OR-device 4. The verification unit 21 also comprises a logic AND-gate 5, an output of which is connected to a clock input of a flip-flop 6. The signal $\overline{CS}$ on the third input of the verification unit 21 is inverted via an inverter 10 and presented to a first input of the logic AND-gate 5. A second input of the logic AND-gate 5 is connected to an output of the comparison unit 3 via a line 12, and a third input of the logic AND-gate 5 is connected to an output of the logic OR-device 4. An output of the flip-flop 6 is connected to the output of the verification unit 21.

In the memory 1 a space 14 of, for example, 4 bits, is reserved for adding to each instruction additional information which relates to a next instruction to be fetched by a connected data processor unit 15 during the execution of the program.

In the present embodiment, the four most significant bits of the addresses of the next instruction to be fetched by the data processor are added to each of a series of instructions in this space 14, as additional information. It is alternatively possible to use most significant address bits of the next instruction to be fetched by the data processor unit as additional information for each and every instruction, but a larger storage space is then required while the efficiency of the device for protection against unauthorized reading is increased only slightly, as will be explained hereinafter. Alternatively, instead of most significant bits, least significant bits or a different combination of bits may be chosen from the address of the next instruction as the additional information. For the other instructions which do not belong to said series, the additional information may contain a fixed value, for example, all bits of the additional information have the value zero. Each such other instruction can then be identified as the next instruction. The program words can thus be subdivided into two groups; namely, a first group in which each program word contains exclusive additional information and a second group in which the additional information is common to all the program words of that second group. It is absolutely necessary for the additional information to relate to the next instruction. The additional information may also relate to a further instruction to be fetched by the data processor unit. However, in that case, the arrangement requires more elements, for example, a counter, so that it becomes more expensive and complex.

Figure 1B:
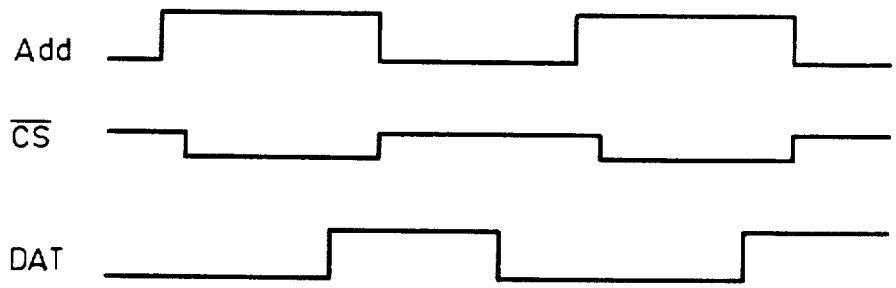
FIG. 1b shows a number of waveform diagrams which illustrate the operation of an arrangement in accordance with the invention.

When a first instruction is addressed in the memory 1 by the data processor unit 15, the additional information associated with the relevant instruction is also addressed. During the addressing of the memory 1, the signal $\overline{CS}$ is at a low level as appears from FIG. 1b. When the memory 1 is addressed by the data processor unit 15, the first instruction fetched as well as the associated additional information will be presented to the first data output and the second data output, respectively, of the memory 1 (data signal DAT high, FIG. 1b). The additional information associated with the relevant first instruction is transferred, via the second data bus 13, to the comparison unit 3 in which it is stored, for example, in a register of the comparison unit. Because said register responds to the positive-going edge of the signal $\overline{CS}$, storage takes place when the level of the signal $\overline{CS}$ changes from low to high. When the data processor unit subsequently fetches a second instruction from the memory 1, a comparison operation is performed by the comparison unit 3. This comparison operation is performed under the control of the negative-going edge of the signal $\overline{CS}$ and in this embodiment the four most significant address bits of the address of the second instruction, as presented to the second input of the comparison unit 3, are compared with the additional information stored in said register of the comparison unit 3.

The result of the comparison operation is positive when the memory 1 is addressed in the correct sequence, as determined by the program of the data processor unit 15, i.e. when the four most significant bits of the address of said second instruction correspond to the four most significant bits of the address of said next instruction which are already present in said register as additional information.

The result of the comparison operation is negative when the memory 1 is addressed in an incorrect sequence, for example, when the content of the memory is being copied and the instructions are not fetched in the sequence determined by the program of the data processor unit. This is because the address of said second instruction then deviates from the address of said next instruction.

The result of the comparison operation appears in inverted form on an output $\overline{EQ}$ of the comparison unit 3 and is presented, via line 12, to said second input of the logic AND-gate 5. The first input of the logic AND-gate 5 receives the signal $\overline{CS}$ in synchronization with the fetching of instructions from the memory.

The logic OR-device 4 has a special function which will be explained in detail hereinafter. As has already been stated, not all instructions comprise exclusive additional information; in this embodiment the memory 1 contains instructions for which all additional information bits have the value zero (second group). When the additional information of an instruction consists exclusively of zeros, the verification operation will be different. However, these zeros will always be applied to the comparison unit 3 when an instruction containing zeros as the additional information is fetched by the processor unit. As a result, the comparison operation may be negative when zeros are presented. In order to suppress such a negative result, use is made of the logic OR-device 4. This logic OR-device performs a logic OR-operation on the bits of the additional information. This means that the result on an output of the logic OR-device 4 assumes the logic value "1" when at least one of the bits of the additional information deviates from zero, the logic value "0" being presented on the output of the logic OR-device when all bits of the additional information have the value zero. Because the result on the output of the logic OR-device 4 is only of importance for the next instructions's comparison operation in comparison unit 3, it should be outputted only when the next instruction is fetched. Therefore, the result of the logic OR-operation is stored in the logic OR-device 4, for example, by the setting of a flip-flop.

Three cases can be distinguished:
1. The result of the comparison operation is positive.
2. The result of the comparison operation is negative and the additional information does not contain only zeros.
3. The result of the comparison operation is irrelevant due to the fact that the additional information contained only zeros.

These three cases will be separately described hereinafter.

1. The result of the comparison operation is positive. In this case the value $\overline{EQ}$="0" is applied, via the line 12, to the second input of the logic AND-gate 5; the output of the logic OR-device 4 carries the value OR="1" which is presented to a third input of the logic AND-gate 5. When an instruction is fetched from the memory 1, the value $\overline{CS}$="1" is applied to a first input of the logic AND-gate 5.

Because $\overline{EQ}$="0", OR="1" and $\overline{CS}$="1", an output of the logic AND-gate 5 outputs a logic value "0" which is presented to a clock input of the flip-flop 6. This logic "0" does not switch over the flip-flop 6 which is, for example, a D-type flip-flop (the flip-flop is adjusted so that it is reset after the switching on of the power supply, i.e. Q=0), so that a logic value "0" is also the output on an output Q of the flip-flop 6 for presentation to the control input S of the selection unit 7. On an output F, the selection unit 7 outputs a signal having the value $F=A.\overline{S}+B.S$. This means that, when the input S receives the logic value "0" (S="0", so $\overline{S}$="1"), the selection unit 7 outputs the instruction fetched from the memory 1 (F=A.1). This is because this instruction is presented to the input A of the selection unit 7 via the first data bus 9. Consequently, when the result of the comparison operation is positive, the correct instruction is presented to a data input of the data processor unit 15 or another user.

2. The result of the comparison operation is negative and the additional information does not contain only zeros. This means that $\overline{EQ}$="1", OR="1" and $\overline{CS}$="1" are presented to the inputs of the logic AND-gate 5. Consequently, a logic value "1" is the output on the output of the logic AND-gate 5. This logic value "1" causes the flip-flop 6 to switch over, so that the value Q="1" is the output on the output Q of the flip-flop 6 to be presented to the input S of the selection unit 7. On the output F, the selection unit outputs the signal F=B.1. This means that information from the data source 8 is presented to a user instead of the instruction requested from the memory 1. Thus, an unauthorized reader will receive nuisance information from the data source 8.

3. The result of the comparison operation is irrelevant due to the fact that the additional information contained only zeros. This means that $\overline{EQ}$="1", OR="0" and CS="1" are presented to the inputs of the logic AND-gate 5, so that the same situation occurs as in the first case. It is thus achieved that it is not necessary to add exclusive additional information to each instruction, so that the space occupied by the additional information remains limited.

Several embodiments are feasible for the data source 8, for example, a register, a random generator, a memory (different from the memory 1) or simply a connection to ground. The data source 8 presents the second input of the selection unit 7 with nuisance data which are not suitable for the execution of the program. The replacement of the instructions of the memory 1 by nuisance data from the data source 8 ensures that the "copied" program is useless. Preferably, the data source 8 does not supply one and the same nuisance word to the input B of the selection unit. Such a word would be quickly recognizable by an unauthorized user. By presenting different nuisance words to the output F of the selection unit 7, when input B is selected, it will be difficult to establish whether the information provided originates from the memory 1 or from the data source 8.

The operation of a device according to FIG. 1a will be illustrated on the basis of the example given hereinafter. The below-table I gives an example of a part of the content of the memory 1.

TABLE I

| address | extra information (14) | instruction/data word |
|---------|------------------------|-----------------------|
| 000000  | 000                    | set a, b, c, d, e = 0 |
| 000001  | 000                    | a = a + 1             |
| 000010  | 001                    | goto 001000           |
| 000011  | 000                    | read p                |
| 000100  | 000                    | display p             |
| 000101  | 000                    | enter b, sote b       |
| 000110  | 000                    | goto 000001           |
| 000111  | 000                    | c = c + 1             |
| 001000  | 001                    | goto 001010 if > 1    |
| 001001  | 000                    | goto 000011           |
| 001010  | 000                    | display b             |
| 001011  | 000                    | b = b − 1             |
| 001111  | 010                    | goto 010001 if b < 5  |
| 010000  | 001                    | goto 001010           |
| 010001  | 000                    | c = a + b             |
| 010101  | 000                    | e = a + c             |

Suppose now that the program is copied by sequentially reading out the successive instructions (for example, by incrementing a counter). No problem will arise during the reading out of the first and the second instruction (addresses 000000 and 000001), because the unauthorized copyist follows the sequence determined by the data processor. When the third instruction (address 000010) is addressed, the extra information 001 (stored in part 14 of the memory 1), formed by the most significant address bits, is fetched and stored in the register of comparison unit 3. Because the extra information contains a bit having the value 1, the value 1 is stored at the output of the OR-gate 4.

When the fourth instruction (address 000011) is fetched, the comparison unit compares the most significant bits of the address presented to the memory, i.e. 000, with the extra information, i.e. 001 stored in this register. The result of this comparison is negative (0). This comparison result is inverted (0 (inverted) = 1) at the output of the comparison unit 3. At the input of the AND-gate 5 there are now presented the values 1, 1, 1 (comparison unit 3, OR-gate 4, (cs (twice inverted) ). The output of AND-gate 5 now has a value 1 which will switch the flip-flop 6, thus causing the selection of the input B of the selector 7, i.e. information from the data source 8 and not the information "read p" from the memory 1. The unauthorized copyist will not notice this, because information is output. When the fifth instruction (address 000100) is fetched, the comparison between the extra information (000) added to the fourth instruction and the most significant bits of the presented address (000) will have a positive result, i.e. inverted output comparison unit = 0, output OR-gate 4 = 0 (or operation on 000), and cs (twice inverted = 1). The output of AND-gate 5 will have the value 0, resetting flip-flop 6, so that input A of the selector will again be chosen. A wrong instruction has thus been introduced between two correct program instructions.

If this fetching operation would have been executed by the data processor during normal execution of the program, the third instruction (goto 001000) would have been executed. In this case the address presented at the address input of the memory by the next instruction after this "goto"-instruction would have been 001000, i.e. with most significant bits 001 which in this case are equal to the extra information (001) added to the third instruction, thus resulting in a positive result of the comparison unit 3 (output 0). The output of the OR-gate 4 for an extra information 001 is equal to 1. Thus, the signals presented at the input of the AND-gate 5 are 0, 1, 1, giving an output equal to 0, thus selecting input A of the selector 7. Consider now the instruction stored at the address 001000 (goto 001010 if a greater than 1) and suppose that the program is copied. By fetching this instruction, the extra information 001 is stored in the register of the comparison unit 3. By fetching the instruction stored at the next address (001001), the comparison will have a positive result (001 extra information = 001 most significant address bits), even in the case the program is copied. This is necessary because otherwise the normal execution of the program by the data processor would be disturbed in case that the "goto"-condition is not satisfied.

Consider now the instruction stored at the address 001001 (goto 000011) and suppose again that the program is copied. When the instruction stored at the address 001010 is read, the comparison result is negative (0 (inverted) = 1), because 001 is not equal to 000. At the output of the OR-gate 4 a signal having the value 0 is presented (extra information is 000). Thus, the signals presented at the input of the AND-gate 5 are 1, 0, 1, giving an output signal having the value 0 and thus supplying correct data at the output of the selector 7. This problem is solved by the device of FIG. 2 where a comparison is done on the whole address rather than on the most significant bits. In the case that jump instructions are stored on addresses having most significant bits different from 000, the copying operation is efficiently disturbed by a device according to FIG. 1a. This is illustrated for the instructions stored at the addresses 001111 and 010000.

Figure 2:
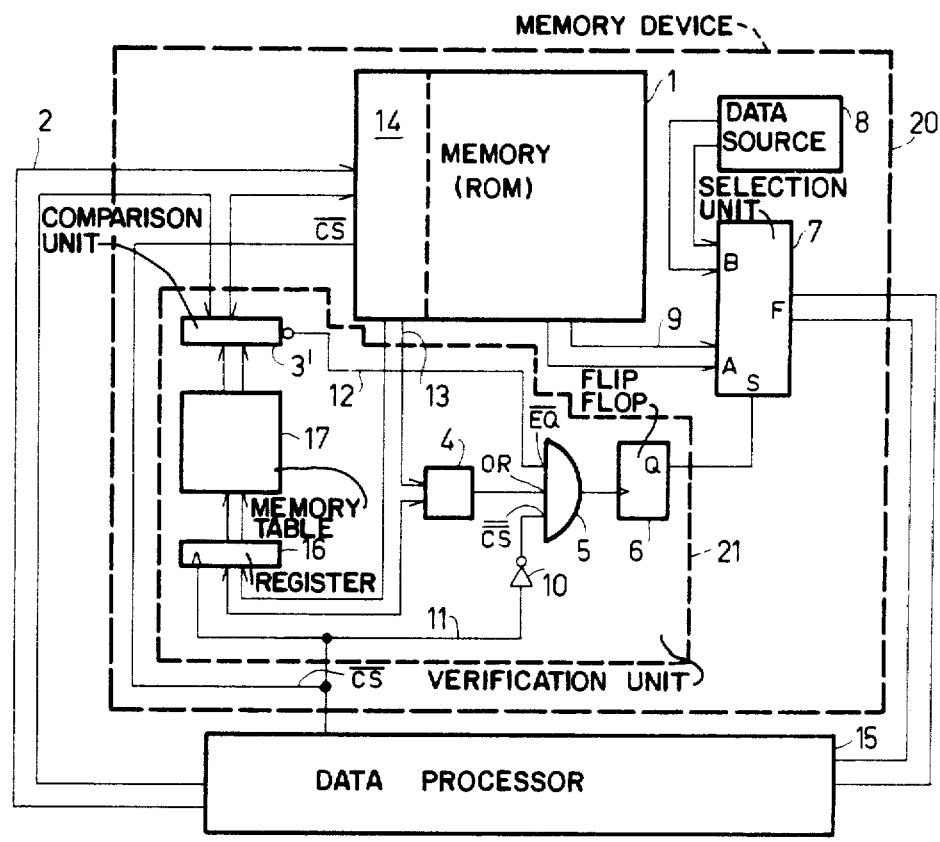
FIG. 2 shows a second embodiment of an arrangement in accordance with the invention.

FIG. 2 shows a further embodiment of a device in accordance with the invention. Elements which correspond to elements of FIG. 1a are denoted by the same reference numeral. Because this embodiment is quite similar to the embodiment shown in FIG. 1a, only the differences will be described herein. The first input of the verification unit 21 is connected to an input of a first register 16. An output of the first register 16 is connected to an input of a memory table 17, an output of which is connected to a first input of the comparison unit 3'. Because this embodiment comprises a first register and a memory table, the comparison unit 3' does not comprise its own register as in the embodiment shown in FIG. 1a. All address bits of the address signal presented to the address input of the memory 1 are presented to the second input of the comparison unit 3'.

When a first instruction is fetched from the memory 1 by the processor unit 15, the additional information associated with this first instruction on the positive going edge of the signal $\overline{CS}$ is transferred to the first register 16 in which it is stored. The additional information in this embodiment contains an address of a memory location in the memory table 17.

When a second instruction is fetched from the memory 1, the memory table 17 is addressed, under the control of the negative-going edge of the signal $\overline{CS}$ on line 11, by the additional information which is associated with the first instruction and which is stored in the first register 16. The addressed memory location in the memory table 17 has stored therein the address of the next instruction which succeeds said first instruction in the sequence determined by the data processor unit for the execution of its program. The address stored at the addressed memory location in the memory table 17 is then presented to the comparison unit 3' in order to be compared with the address of the second instruction. The further operation of the memory device shown in FIG. 2 is completely analogous to that of the device described with reference to FIG. 1a.

The advantage of the use of a first register and a memory table is that now the comparison operation can be performed on the entire address instead of on a part of the address, without substantial space in the memory 1 being required for the storage of additional information. This is because when, for example, 4 bits are reserved in the memory 1 per instruction word for the storage of additional information, an effective comparison operation (i.e. a comparison operation where the additional information does not have the value zero for each of its bits) can be performed on 15 complete addresses ($2^4 - 1 = 16 - 1 = 15$, not taking into account 0000). If the complete address were written in the memory as additional information, for example, 11 bits would be required in order to obtain the same result, while for the present embodiment four bits suffice. A comparison operation performed on the entire address, moreover, is more reliable than a comparison operation performed on only a part of the address, because in the former case all bits are tested.

Figure 3:
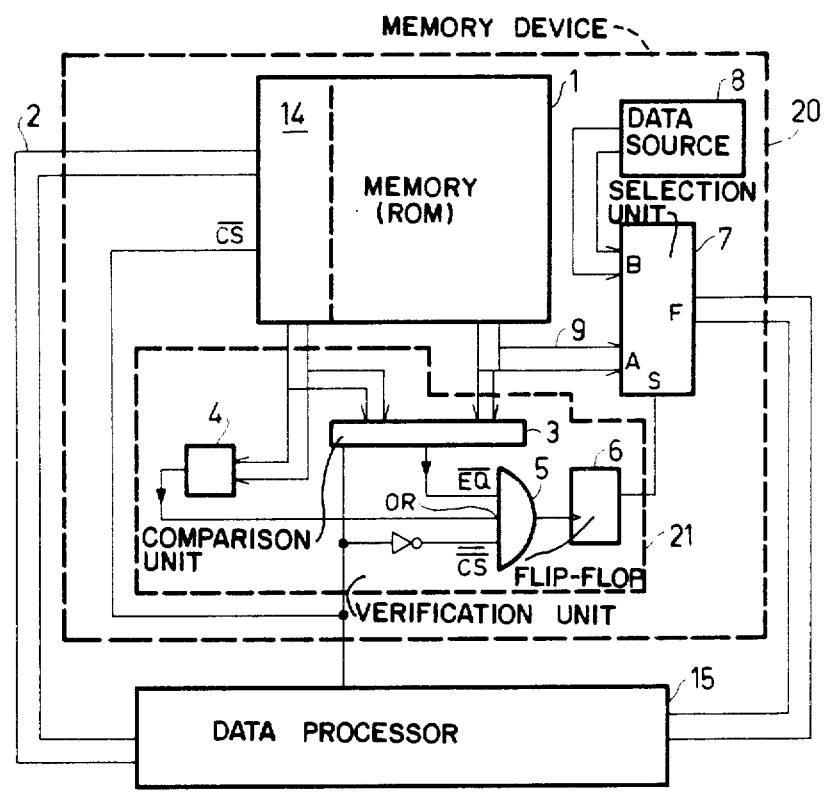
FIG. 3 shows another embodiment of an arrangement in accordance with the invention, in which verification is performed on the basis of program words.

FIG. 3 shows an embodiment of a device in accordance with the invention in which the verification operation is performed on the instruction word. Elements which correspond to those of FIG. 1a are again denoted by the same reference numerals and only the differences will be described herein.

The first data output of the memory 1 is connected on the one hand, via the first data bus 9, to the first (A) input of the selection unit 7 and on the other hand, to the second input of the verification unit 21.

In the present embodiment, the additional information contains a few bits, for example, the most significant bits, of a subsequent instruction word to be fetched by the processor unit. During a comparison operation, this additional information is compared in the comparison unit 3 with a second instruction word fetched. Again three cases can be distinguished, as regards the result of the comparison operation, as described with reference to FIG. 1a.

Evidently, an embodiment as described with reference to FIG. 2, in which the verification unit also includes a first register and a memory table, can be used for a memory device in accordance with the invention in which the verification operation is performed on the instruction word.

Random access parts of the memory, for example, index tables or given data words, can be protected by imposing, for example, the following validity criterion: start address index table $\leq$ next address $\leq$ last address index table. However, the protection of these parts may be omitted, if desired. This is because an unauthorized reader does not know which part of the memory is protected; this is inter alia due to the fact that correct information can not be distinguished from information from the data source 8.

The entire memory device 20 may be constructed in integrated form. An integrated version is to be preferred over a version comprising discrete components, because in the latter version a smart unauthorized reader might successfully lock the selection unit 7 in a state F=A.1.

A device for protection against the unauthorized reading of program words stored in a memory of the described kind is used in data processing systems which are sold in comparatively large numbers. Examples of such systems are video games.

What is claimed is:

1. A device for protection against the unauthorized reading of program words stored in a (14) memory which forms part of a memory unit 20, said protection device comprising:
   a data processor unit having an address output which is connected to an address input of said memory in order to address the stored program words during a processing operation in a given sequence which is determined by the data processor unit;
   said memory unit (20) comprises a nuisance word source which is separate from the memory (14), and which serves to supply at least one nuisance word which is unrelated to said program words, a verification unit and a selection unit;
   said selection unit comprises a control unit, a first data input connected to a first output of the memory and a second data input connected to an output of the nuisance word source;
   said memory having a program field comprising the program words and an additional field in which there is stored an additional information for each program word, said additional information being addressed simultaneously with its respective program word;

said additional field being connected to a second output of the memory to which a first input of the verification unit is also connected; a second input of the verification unit being connected to a further connection of the memory;

said verification unit comprises a storage element connected to said first input for storing an indicator derived from the additional information of a first program word when read from the memory;

said stored indicator indicates a program word subsequent to the first program word as determined by said sequence;

said verification unit comprising verifying means for verifying, when a second program word is read from the memory, whether the program information in respect of the read second program word corresponds to the stored indicator;

said verification unit being further provided for generating a first signal when the verification results in correspondence and a second signal when the verification results in non-correspondence;

the selection unit being provided for supplying the read program word from the memory on an output under the control of the first signal received at its control input and to block the supply of the read program word from the memory under the control of a received second signal and to replace this read program on the output by a nuisance word generated by the nuisance word source.

2. A device as claimed in claim 1, characterized in that said connection to the memory is an address input thereof, and said program information contains at least a part of the address of the program word.

3. A device as claimed in claim 2, characterized in that the storage element of the verification unit comprises a register and a memory table, an input of said register being connected to the first input of the verification unit, an output of the data processor unit being connected to a command input of said register, an output of said register being connected to an address input of the memory table, said memory table being provided for the storage of the indicators which are formed by program word addresses, said additional information containing an address for a location in the memory table.

4. A device as claimed in claim 1, characterized in that said connection to the memory is a data output thereof, and said program information contains at least a part of the program word.

5. A device as claimed in claim 4, characterized in that the storage element of the verification unit comprises a register and a memory table, said register comprising an input which is connected to the first input of the verification unit, an output of the data processor unit being connected to a command input of said register, said register comprising an output which is connected to an address input of the memory table, said memory table being provided for the storage of the indicators which are formed by program words, said additional information containing an address for a location in the memory table.

6. A device as claimed in claim 1, characterized in that said verifying means of the verification unit comprises a comparison unit.

7. A device as claimed in claim 1, characterized in that said program words to be protected are subdivided into two different groups, exclusive additional information being stored in said additional field for each program word of a first group, and non-exclusive additional information being stored in said additional field for each program word of a second group, said verification unit comprising recognition means responsive to the recognition of additional information of said second group for deactivating the comparison unit under the control of an additional information of said second group, and for generating a first signal.

8. A device as claimed in claim 1, characterized in that said nuisance word source comprises a random generator.

9. A device as claimed in claim 1, characterized in that said nuisance word source comprises a register.

10. A device as claimed in claim 1, characterized in that the memory is a non-volatile memory.

11. A device as claimed in claim 1, characterized in that the memory unit is constructed using an integrated circuit technique.

* * * * *